United States Patent
Yuang et al.

(10) Patent No.: US 6,859,458 B2
(45) Date of Patent: Feb. 22, 2005

(54) MULTIPLE ACCESS CONTROL SYSTEM WITH INTELLIGENT BANDWIDTH ALLOCATION FOR WIRELESS ATM NETWORKS

(75) Inventors: Maria C. Yuang, Taipei (TW); Po-Lung Tien, Taipei (TW); Chien-Lin Chen, Taipei (TW)

(73) Assignee: Institute for Information Industry, Taipei (TW)

( * ) Notice: Subject to any disclaimer, the term of this patent is extended or adjusted under 35 U.S.C. 154(b) by 859 days.

(21) Appl. No.: 09/843,801

(22) Filed: Apr. 30, 2001

(65) Prior Publication Data

US 2004/0202121 A1 Oct. 14, 2004

(51) Int. Cl.[7] .............................. H04L 12/28; H04J 3/16; H04B 7/216
(52) U.S. Cl. .................. 370/395.43; 370/468; 370/347; 370/342
(58) Field of Search ....................... 370/395.43, 395.21, 370/468, 477, 229, 255, 338, 342, 347, 329, 210, 228

(56) References Cited

U.S. PATENT DOCUMENTS

| | | | | |
|---|---|---|---|---|
| 5,684,791 A | * | 11/1997 | Raychaudhuri et al. | 370/310.2 |
| 6,181,684 B1 | * | 1/2001 | Turcotte et al. | 370/332 |
| 6,747,976 B1 | * | 6/2004 | Bensaou et al. | 370/395.4 |

* cited by examiner

*Primary Examiner*—Duc Ho
(74) *Attorney, Agent, or Firm*—Bacon & Thomas PLLC

(57) ABSTRACT

In a multiple access control system with intelligent bandwidth allocation for wireless ATM networks, an intelligent bandwidth allocator is provided for statically allocating reservation type bandwidth and dynamically allocating contention type bandwidth to the mobile terminal. A traffic estimator/predicator is provided for predicting the CNF value of a subsequent frame by the CNF value of at least one frame, and determining the number of the SCR slots and ABR slots to be allocated. A multiple access controller is used for providing the reservation type bandwidth with a multiple access function in a reservation access manner, and providing the contention type bandwidth with a multiple access function in a contention access manner.

6 Claims, 4 Drawing Sheets

MULTIPLE ACCESS CONTROL SYSTEM WITH INTELLIGENT BANDWIDTH ALLOCATION FOR WIRELESS ATM NETWORKS

BACKGROUND OF THE INVENTION

1. Field of the Invention

The present invention relates to the field of wireless ATM (Asynchronous Transfer Mode) networks and, more particularly, to a multiple access control system with intelligent bandwidth allocation for wireless ATM networks.

2. Description of Related Art

With the rapid proliferation of personal communication services provided to multimedia portable computers, wireless access to existing networks has emerged as a significant concern. Essentially, wireless ATM has been envisioned as a potential framework for next-generation wireless networks capable of supporting integrated multimedia services with a wide range of services rates and different quality of service (QoS). Expected supported services include constant bit rate (CBR), variable bit rate (VBR), available bit rate (ABR), and signaling control (SCR) for CBR/VBR traffic. Therefore, it is getting complicated to allocate proper bandwidths to different services based on the actual requirements. Accordingly, it is desirable to provide an improved system to efficiently allocate the bandwidth of the wireless ATM network.

SUMMARY OF THE INVENTION

The object of the present invention is to provide a multiple access control system with intelligent bandwidth allocation for wireless ATM networks, which is able to dynamically allocate the bandwidth based on the actual condition of the network, so as to achieve the optimal usage of the bandwidth.

In accordance with the present invention, the wireless ATM network transfers information via frames, and each frame is divided into a plurality of slots to be allocated to constant bit rate (CBR), variable bit rate (VBR), available bit rate (ABR), and signaling control (SCR) traffic classes. The frame has a common notification field (CNF) slot for being placed with code sequences by mobile terminals using ABR slots. The present multiple access control system comprises: an intelligent bandwidth allocator for allocating reservation type bandwidth to the mobile terminal when the mobile terminal requests a CBR/VBR traffic, and dynamically allocating contention type bandwidth to the mobile terminal when the mobile terminal requests SCR and ABR traffics; a traffic estimator/predicator for predicting the CNF value of a subsequent frame by the CNF value of at least one frame, and determining the number of the SCR slots and ABR slots to be allocated by the intelligent bandwidth allocator based on an optimal allocation model for the contention type bandwidth constructed in offline; and, a multiple access controller for providing the reservation type bandwidth with a multiple access function in a reservation access manner, and providing the contention type bandwidth with a multiple access function in a contention access manner.

Other objects, advantages, and novel features of the invention will become more apparent from the following detailed description when taken in conjunction with the accompanying drawings.

DETAILED DESCRIPTION OF THE PREFERRED EMBODIMENT

The multiple access control system with intelligent bandwidth allocation for wireless ATM networks in accordance with the present invention is provided to operate in the base station (BS) of an infrastructure-based wireless ATM network. An uplink channel is provided between the base station and a mobile terminal (MT), so as to transfer information from mobile terminals (MT's) to the BS. The time on the uplink channel is divided into a contiguous sequence of fixed-size TDMA (Time Division Multiple Access) frames.

Figure 1:
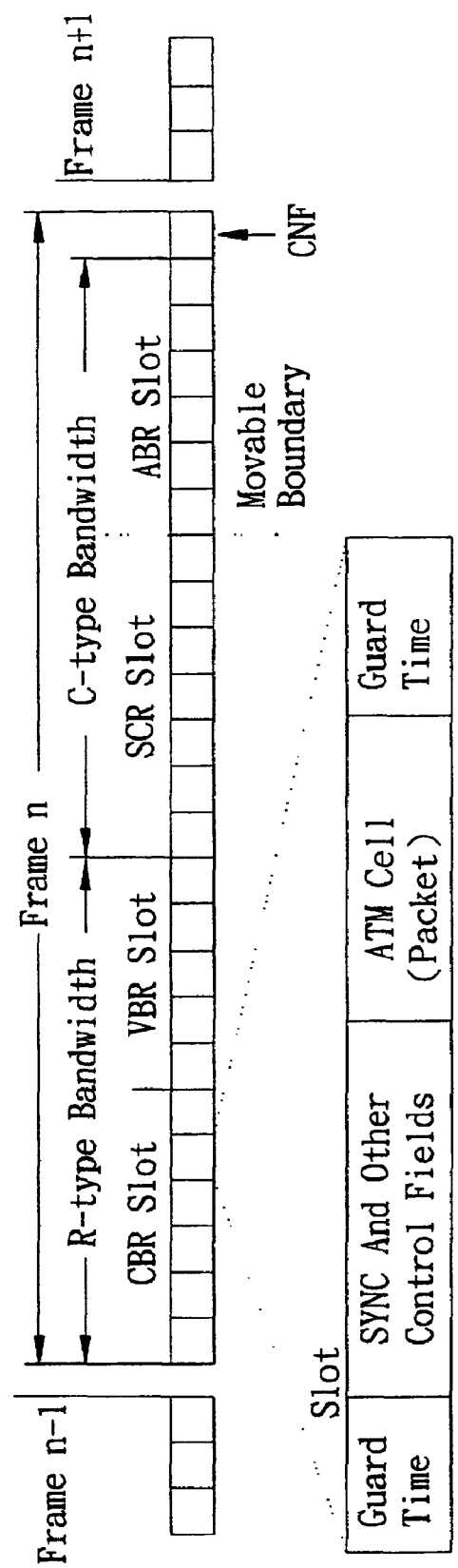
FIG. 1 shows the structure of the frame in an uplink channel in accordance with the present invention.

FIG. 1 shows the structure of the frame in the uplink channel. As shown, each frame is divided into a fixed number of slots to be dynamically allocated to four ATM-traffic classes: CBR, VBR, ABR and SCR, wherein the CBR and VBR traffic are governed by reservation access using reservation (R) type bandwidth, and the ABR and SCR traffic are controlled by contention access using contention (C) type bandwidth. Each slot contains a data packet or, more specifically, an ATM cell, other than guard times, sync and other control fields. With guard times provided, the propagation delay between the BS and MT's can be ignored.

Furthermore, the network is assumed to use phase-shift keying (PSK)-based encoding equipped with simple CDMA (Code Division Multiple Access) capability, namely, pseudo-code sequence generation. Essentially, all MT's with ABR packets in their buffers are required to inform the BS through placing different code sequences at the last slot of each frame, called the common notification field (CNF). Due to the orthogonality and phase difference of CDMA, the BS is able to identify the total number of different codes, which corresponds to the total number of active MT's during the last frame. This information is provided for the on-line traffic estimation and prediction.

Figure 2:
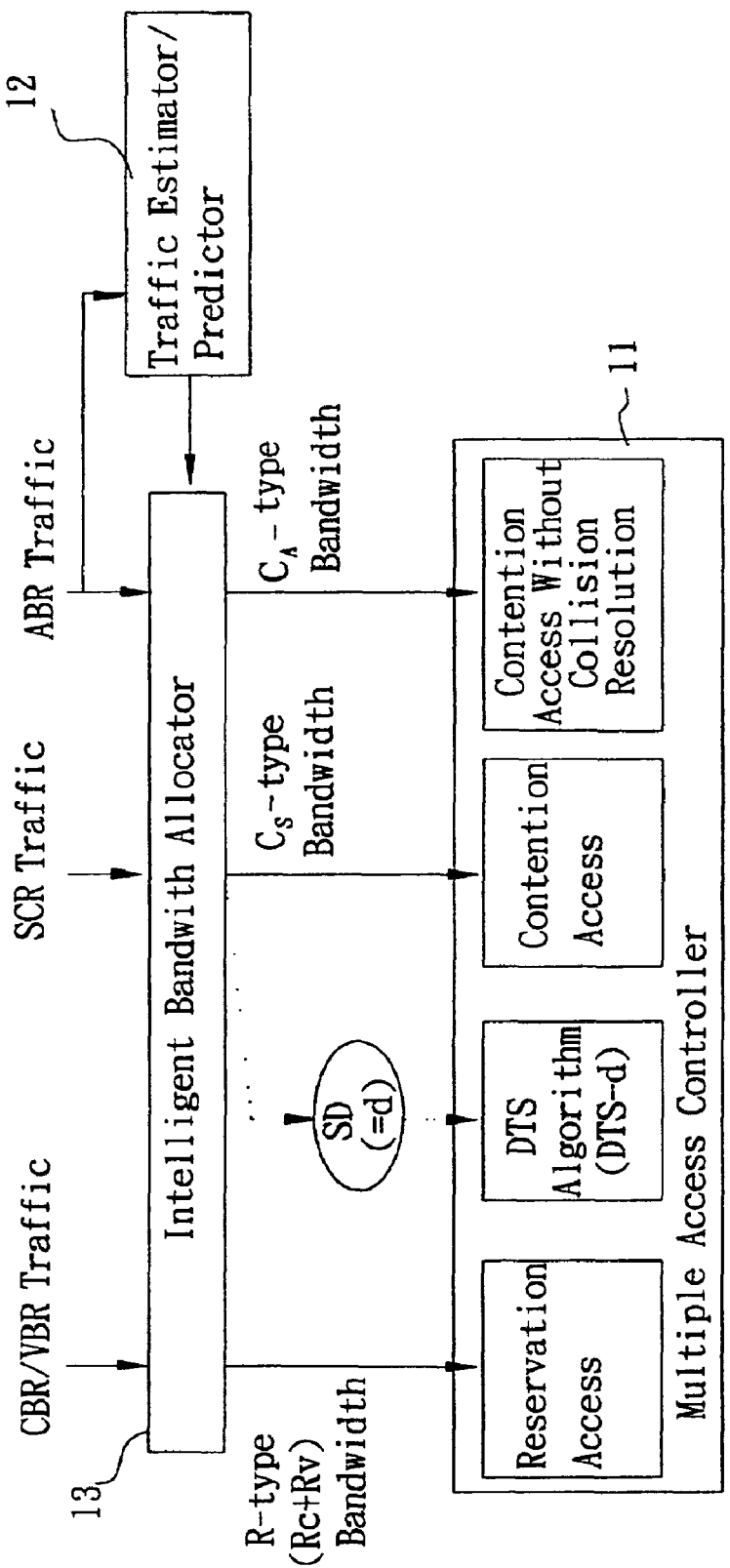
FIG. 2 shows the structure of the multiple access control system with intelligent bandwidth allocation for wireless ATM networks in accordance with the present invention.

FIG. 2 shows the structure of the multiple access control system with intelligent bandwidth allocation for wireless ATM networks in accordance with the present invention, which is composed of three major components: multiple access controller 11, traffic estimator/predictor 12, and intelligent bandwidth allocator 13. The multiple access control system supports four types of traffic—CBR, VBR, ABR, and SCR, wherein the system employs a reservation-based access protocol for CBR and VBR traffic making use of a fixed amount of $R_C$-type and $R_V$-type bandwidth ($R_C+R_V=R$) (in slots), respectively. By contrast, for SCR and ABR traffic, the system adopts a contention-based access protocol using $C_S$-type and $C_A$-type bandwidth ($C_S+C_A=C$) (in slots), respectively.

The intelligent bandwidth allocator 13 takes responsibility for the static allocation of R-type bandwidth or dynamic allocation of C-type bandwidth based on the requested traffic, which may be CBR/VBR, SCR, or ABR, from the MT's. When a MT establishes a call connection for performing CBR/VBR traffic, the intelligent bandwidth allocator 13 allocates R ($R_C+R_V$) type bandwidth to the MT, and the multiple access controller provides a multiple access function based on a reservation access manner. Specifically, CBR and VBR traffics are statically allocated with fixed amounts of bandwidth ($R_C$ and $R_V$) for an entire call, satisfying the duty cycle and maximum end-to-end delay requirements.

As to the SCR and ABR traffic to be performed by the MT's, the intelligent bandwidth allocator 13 is provided to dynamically allocate $C_S$ and $C_A$ type bandwidth. That is, also with reference to FIG. 1, the boundary between the SCR slots and the ABR slots of the C-type bandwidth in a frame can be dynamically adjusted, such that the allocated number of SCR slots and ABR slots can meet the actual requirements.

Figure 3:
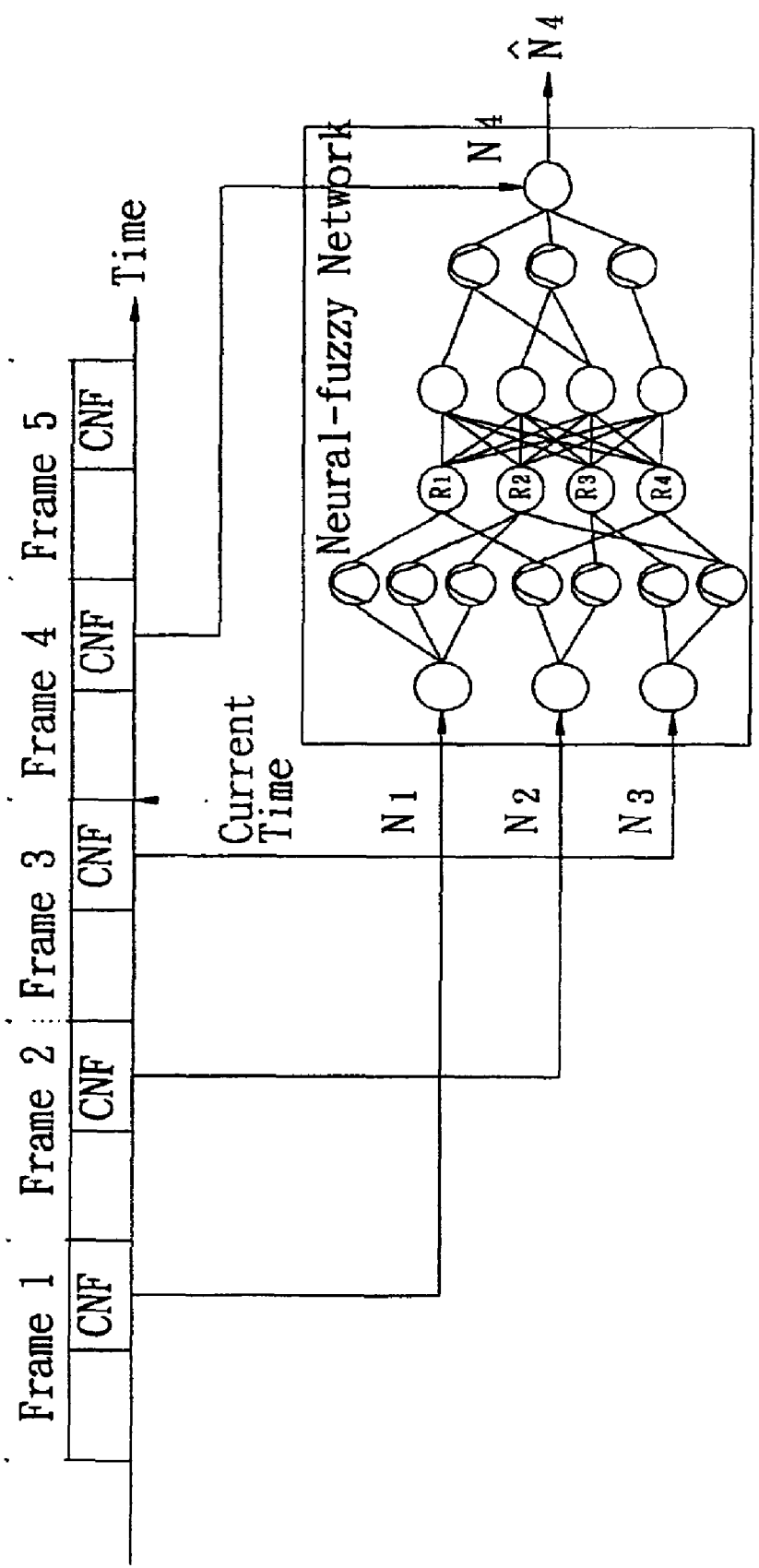
FIG. 3 shows a traffic estimator/predicator formed by a neural-fuzzy network.

In using the intelligent bandwidth allocator 13 to allocate the $C_S$ and $C_A$ type bandwidth of a frame, the objective is aimed at satisfying acceptable SCR blocking probability and minimum ABR throughput, while retaining maximal aggregate throughput. To achieve this objective, the traffic estimator/predicator is responsible for the periodic estimation of the Hurst parameter, and the prediction of the short term mean and variance of ABR traffic. The Hurst parameter is periodically estimated based on wavelet analysis. The short-term mean and variance for the subsequent frame are predicted by means of an on-line neural-fuzzy approach. With reference to FIG. 3, there is illustrated a traffic estimator/predicator 12 constructed by a neural-fuzzy network with three inputs. This network predicts the future CNF value ($\tilde{N}_4$), which corresponds to the mean number of active MT's in the subsequent frame, based on the three input values taken from three most-recent CNF values $N_1$, $N_2$ and $N_3$. At the end of the subsequent frame, an actual CNF value $N_4$ is generated, which is also input to the neural-fuzzy network to perform a learning operation.

The multiple access control system can determine an optimal allocation model of C-type bandwidth based on various CNF values in offline. For example, it is applicable to establish a table including CNF values and the corresponding numbers of SCR slots and ABR slots to be allocated in advance. Therefore, when the system is on line, the traffic estimator/predicator 14 can find out the allocated number of SCR slots and ABR slots from the model based on the predicted CNF value and $\tilde{N}_4$.

Figure 4:
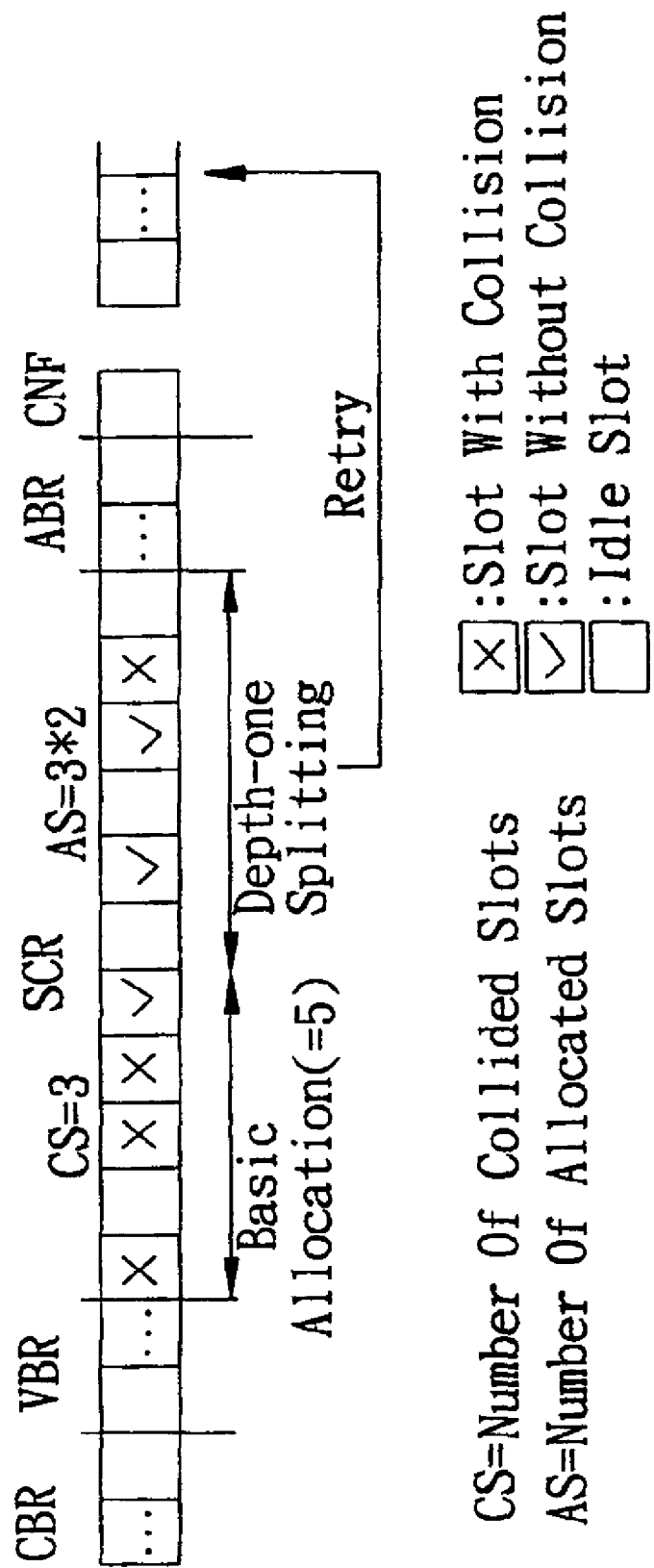
FIG. 4 shows an example using a DTS algorithm with a splitting depth of 1 to resolve the collision.

The SCR traffic predicted and determined before starting a frame is called the basic allocation (in slots). The slots from the basic allocation are randomly accessed by the users. If two or more users wish to use the same SCR slot, a collision is encountered. To resolve the collision, the multiple access controller 11 executes a dynamic tree splitting (DTS) collision resolution algorithm using an optimal splitting depth (SD) (SD=d). Should collisions occur and the number of splitting is less than d, twice as many as the number of collided slots are allocated at the next splitting level. This process repeats until either there is no collision or the number of splitting levels has reached d, thereby resolving the collision problem. All unresolved transmissions then back off in the next frame. In FIG. 4, there is illustrated an example of the DTS-1 algorithm using 5-slot basic allocation. In the example, due to the presence of 3-slot collision in the basic allocation, a number of 6 (3*2) slots are allocated at the next splitting level. Collision resolution terminates after the depth-one splitting and the unresolved slot will back off in the subsequent frame. In addition, the C-type slots, other than those allocated to the SCR slots, are provided as the ABR slots. The multiple access controller 11 provides the ABR slots with a multiple access function in a contention manner without collision resolution.

In view of the foregoing, it is known that the multiple access control system with intelligent bandwidth allocation for wireless ATM networks in accordance with the present invention is able to dynamically allocate the bandwidth based on the actual condition of the wireless ATM network. The bandwidth allocation of the subsequent frame can be predicted by the CNF value of the frame, and the collision is resolved by using the DTS algorithm, thereby achieving the optimal efficiency in the use of the bandwidth.

Although the present invention has been explained in relation to its preferred embodiment, it is to be understood that many other possible modifications and variations can be made without departing from the spirit and scope of the invention as hereinafter claimed.

What is claimed is:

1. A multiple access control system with intelligent bandwidth allocation for wireless ATM networks which transfer information via frames, each frame being divided into a plurality of slots to be allocated to constant bit rate (CBR), variable bit rate (VBR), available bit rate (ABR), and signaling control (SCR) traffic classes, the frame having a common notification field (CNF) slot for being placed with code sequences by mobile terminals using ABR slots, the system comprising:

an intelligent bandwidth allocator for allocating reservation type bandwidth to the mobile terminal when the mobile terminal requests a CBR/VBR traffic, and dynamically allocating contention type bandwidth to the mobile terminal when the mobile terminal requests SCR and ABR traffics;

a traffic estimator/predicator for predicting the CNF value of a subsequent frame by the CNF value of at least one frame, and determining the number of the SCR slots and ABR slots to be allocated by the intelligent bandwidth allocator based on an optimal allocation model for the contention type bandwidth constructed in offline; and a multiple access controller for providing the reservation type bandwidth with a multiple access function in a reservation access manner, and providing the contention type bandwidth with a multiple access function in a contention access manner.

2. The system as claimed in claim 1, wherein the multiple access controller executes a dynamic tree splitting collision resolution algorithm using an optimal splitting depth of d, such that, when collisions occur and the number of splitting is less than d, twice as many as the number of collided slots are allocated at the next splitting level, and this process repeats until either there is no collision or the number of splitting levels has reached d.

3. The system as claimed in claim 1, wherein the traffic estimator/predicator is formed by a neural-fuzzy network to predict the CNF value of a subsequent frame.

4. The system as claimed in claim 3, wherein the neural-fuzzy network predicts a future CNF value based on a plurality of most-recent CNF values, and at the end of the subsequent frame, an actual CNF value is generated, which is also input to the neural-fuzzy network to perform a learning operation.

5. The system as claimed in claim 1, wherein the CNF slot is the last slot of a frame.

6. The system as claimed in claim 1, wherein the optimal allocation model for the contention type bandwidth is a table including CNF values and corresponding numbers of SCR slots and ABR slots to be allocated.

* * * * *